United States Patent
Mitchell et al.

(10) Patent No.: US 9,139,981 B2
(45) Date of Patent: Sep. 22, 2015

(54) RIMPULL DERATE MANAGEMENT IN A MACHINE WITH INDEPENDENT POWERTRAINS

(71) Applicant: Caterpillar Inc., Peoria, IL (US)

(72) Inventors: Michael D. Mitchell, Aurora, IL (US); Mark A. Robinson, Davis Junction, IL (US); Sameer S. Marathe, Yorkville, IL (US)

(73) Assignee: Caterpillar Inc., Peoria, IL (US)

( * ) Notice: Subject to any disclaimer, the term of this patent is extended or adjusted under 35 U.S.C. 154(b) by 28 days.

(21) Appl. No.: 14/174,311

(22) Filed: Feb. 6, 2014

(65) Prior Publication Data
US 2015/0218779 A1   Aug. 6, 2015

(51) Int. Cl.
| | |
|---|---|
| *F16H 61/38* | (2006.01) |
| *F16D 31/02* | (2006.01) |
| *E02F 9/20* | (2006.01) |
| *E02F 3/34* | (2006.01) |
| *G06F 19/00* | (2011.01) |

(52) U.S. Cl.
CPC ............. *E02F 9/2025* (2013.01); *E02F 3/34* (2013.01)

(58) Field of Classification Search
CPC ........ B60W 10/02; F16H 61/38; F16D 31/02; G06F 19/00
USPC ..................... 701/50, 51, 69, 89; 477/52, 174
See application file for complete search history.

(56) References Cited

U.S. PATENT DOCUMENTS

| | | | |
|---|---|---|---|
| 4,723,616 A | 2/1988 | Van Der Lely | |
| 8,095,285 B2 | 1/2012 | Schifferer et al. | |
| 9,002,595 B2 * | 4/2015 | Davis et al. | 701/51 |
| 2008/0161152 A1 | 7/2008 | St. Aubin et al. | |
| 2010/0114440 A1 * | 5/2010 | Lin et al. | 701/50 |
| 2011/0024222 A1 | 2/2011 | Honzek | |
| 2011/0224858 A1 | 9/2011 | Bissontz | |
| 2013/0030664 A1 | 1/2013 | Yagi et al. | |
| 2013/0245896 A1 * | 9/2013 | Velde et al. | 701/50 |

FOREIGN PATENT DOCUMENTS

| | | |
|---|---|---|
| JP | 5007269 B2 | 11/2009 |
| KR | 1020120075973 | 7/2012 |

* cited by examiner

*Primary Examiner* — Tan Q Nguyen
(74) *Attorney, Agent, or Firm* — Miller, Matthias & Hull LLP

(57) ABSTRACT

A system for derating rimpull on a machine, and a related method and computer program product are disclosed. The system may comprise a one or more front wheels, one or more rear wheels, one or more front powertrains, one or more rear powertrains, a hydraulic system, an engine, and a controller. The controller configured to determine a Total Rimpull Derate for the machine, determine a Final Rear Derate Amount, derate rear wheel rimpull by the Final Rear Derate Amount, and, if the Final Rear Derate Amount is less than the Total Rimpull Derate for the machine, derate front wheel rimpull by the Shortfall.

20 Claims, 5 Drawing Sheets

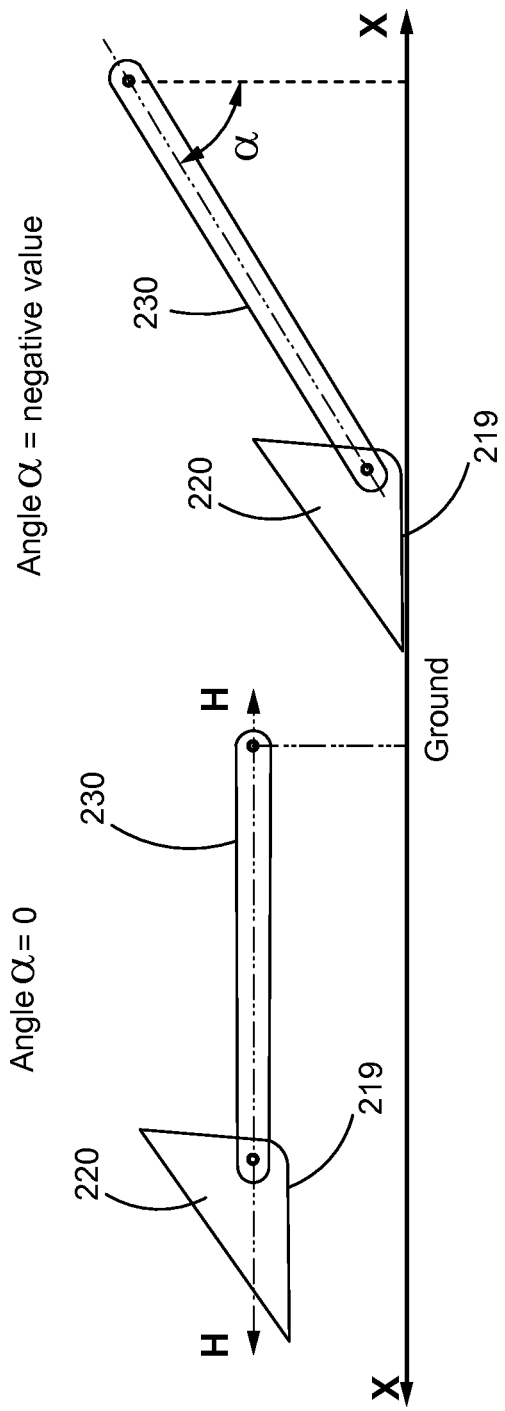

RIMPULL DERATE MANAGEMENT IN A MACHINE WITH INDEPENDENT POWERTRAINS

TECHNICAL FIELD

The present disclosure generally relates to machine systems and, more particularly, for systems for use on machines with independent powertrains to derate rimpull.

BACKGROUND

The force available at the wheels to move a wheeled machine or vehicle forward may be referred to as rimpull. There may be occasions when it is desirable to derate the wheel rimpull associated with vehicles having independent powertrains. For example, in a wheel loader application, for greater productivity it is desirable to achieve an appropriate hydraulic to rimpull balance.

U.S. Publication. No. 2013/0030664 published on Jan. 31, 2013 (the '664 Publication) discloses a method of redistributing torque from the primary driven wheels to the secondary driven wheels based on a running state of a four-wheel drive vehicle. For example, when a four-wheel drive vehicle is set for two-wheel drive mode for driving only the front wheels and the running state of the vehicle changes (the speed of the vehicle increases) the publication discloses controllably distributing torque to the rear wheels. In one embodiment this is accomplished via an electromagnetic coupling located in a driving force transmission path. This type of system has inherent drawbacks. A system is needed for derating rimpull in machines in which the powertrains are independent of each other.

SUMMARY OF THE DISCLOSURE

In accordance with one aspect of the disclosure, a machine system for controlling rimpull on a machine is disclosed. The machine may include an implement connected to the machine. The machine system may comprise a front wheel and a rear wheel, a front powertrain operably connected to the front wheel, and a rear powertrain operably connected to the rear wheel, a hydraulic system, an engine, and a controller. Each of the front and rear wheels may be mounted on the machine. Each powertrain may be independently operable of the other. The hydraulic system may include an implement hydraulic system, and a pump having an output port that provides fluid to the implement hydraulic system to move the implement. The engine may provide power to each powertrain, and to the pump. The controller may be in operable communication with the engine, the pump and each powertrain. The controller may be configured to determine a Total Rimpull Derate for the machine based at least in part on machine speed, and hydraulic pressure at the output port of the pump or hydraulic load, determine a Final Rear Derate Amount, derate rear wheel rimpull by the Final Rear Derate Amount, and if the Final Rear Derate Amount is less than the Total Rimpull Derate for the machine, derate front wheel rimpull by a difference between the Total Rimpull Derate and the Final Rear Derate Amount.

In an embodiment, the Total Rimpull Derate may be determined, at least in part, based on Total Requested Machine Rimpull.

In another embodiment, the Total Rimpull Derate may be determined, at least in part, based on the machine's hydraulic load.

In an embodiment, the Total Rimpull Derate may be determined, at least in part, based on the machine's hydraulic pressure at the output port of the pump.

In an embodiment, the controller may be further configured to determine an Estimated Rear Rimpull, and, if the Estimated Rear Rimpull is greater than or equal to a Rear Rimpull Floor, set the Final Rear Derate Amount substantially equal to the Total Rimpull Derate and apply substantially no rimpull derate to the front wheel rimpull.

In an embodiment, the controller may be further configured to determine an Estimated Rear Rimpull, and if the Estimated Rear Rimpull is less than a Rear Rimpull Floor, derate the rear wheel rimpull until the rear wheel rimpull is substantially equal to the Rear Rimpull Floor.

In another embodiment, the machine may further include a lift arm pivotally mounted to the machine, and the hydraulic system may further include a lift arm hydraulic system, wherein the pump may be configured to provide fluid to the lift arm hydraulic system to move the lift arm, and wherein further the Total Rimpull Derate for the machine may be determined if the machine is digging. In a refinement, the controller may be further configured to determine whether the machine is digging based, at least in part on, engine load.

In an embodiment, the front wheel may be comprised of first and second front wheels, the rear wheel may be comprised of first and second rear wheels, the front powertrain may be comprised of first and second front powertrains, and the rear powertrain may be comprised of first and second rear powertrains. The wheels and powertrains may be in a one-to-one correspondence.

In accordance with another aspect of the disclosure, a method for derating rimpull on a machine is disclosed. The machine may include a front wheel, a rear wheel, a front powertrain operably connected to the front wheel, and a rear powertrain operably connected to the rear wheel. Each powertrain may be independent of the other. The method may comprise, when the machine is digging, determining a Total Rimpull Derate for the machine based, at least in part, on machine speed, determining a Final Rear Derate Amount, derating the rear wheel rimpull by the Final Rear Derate Amount, and if the Final Rear Derate Amount is less than the Total Rimpull Derate for the machine, derating the front wheel rimpull by a difference between the Total Rimpull Derate and the Final Rear Derate Amount.

In an embodiment, the Total Rimpull Derate may be determined, at least in part, based on Total Requested Machine Rimpull.

In another embodiment, the Total Rimpull Derate may be determined, at least in part, based on the machine's hydraulic load.

In an embodiment, the Total Rimpull Derate may be determined, at least in part, based on the machine's hydraulic pressure at an output port of a pump that supplies hydraulic fluid to a lift arm hydraulic system and an implement hydraulic system disposed on the machine.

In another embodiment, the method may further comprise determining an Estimated Rear Rimpull and, if the Estimated Rear Rimpull is greater than or equal to a Rear Rimpull Floor, setting the Final Rear Derate Amount substantially equal to the Total Rimpull Derate and applying substantially no rimpull derate to the front wheel rimpull.

In another embodiment, the method may further comprise determining an Estimated Rear Rimpull and, if the Estimated Rear Rimpull is less than a Rear Rimpull Floor, derating the rear wheel rimpull until the rear wheel rimpull is substantially equal to the Rear Rimpull Floor.

In another embodiment, the method may further comprise determining whether the machine is digging based, at least in part on, engine load for the machine.

In an embodiment, the front wheel may be comprised of first and second front wheels, the rear wheel may be comprised of first and second rear wheels, the front powertrain may be comprised of first and second front powertrains, and the rear powertrain may be comprised of first and second rear powertrains. The wheels and powertrains may be in a one-to-one correspondence, each powertrain operably connected to an engine independent of the other powertrains.

In accordance with a further aspect of the disclosure, a computer program product is disclosed. The computer program product may comprise a non-transitory computer usable medium having a computer readable program code embodied therein. The computer readable program code may be adapted to be executed to implement a method for derating rimpull on a machine. The machine may include a front wheel, a rear wheel, a front powertrain operably connected to the front wheel, and a rear powertrain operably connected to the rear wheel. Each powertrain may be independent of the other. The method may comprise, when the machine is digging, determining a Total Rimpull Derate for the machine based at least in part on the machine speed and the hydraulic load or pressure, determining a Final Rear Derate Amount, derating the rear wheel rimpull by the Final Rear Derate Amount, and, if the Final Rear Derate Amount is less than the Total Rimpull Derate for the machine, derating the front wheel rimpull by a difference between the Total Rimpull Derate and the Final Rear Derate Amount. In an embodiment the method may further comprise determining an Estimated Rear Rimpull, and, if the Estimated Rear Rimpull is greater than or equal to a Rear Rimpull Floor, setting the Final Rear Derate Amount substantially equal to the Total Rimpull Derate and applying substantially no rimpull derate to the front wheel rimpull. In an embodiment, the method may further comprise determining an Estimated Rear Rimpull, if the Estimated Rear Rimpull is less than a Rear Rimpull Floor, derating the rear wheel rimpull until the rear wheel rimpull is substantially equal to the Rear Rimpull Floor.

BRIEF DESCRIPTION OF THE DRAWINGS

FIG. 5A is a schematic illustrating angle α equal to zero; and

FIG. 5B is a schematic illustrating angle α equal to a non-zero value.

DETAILED DESCRIPTION

Figure 1:
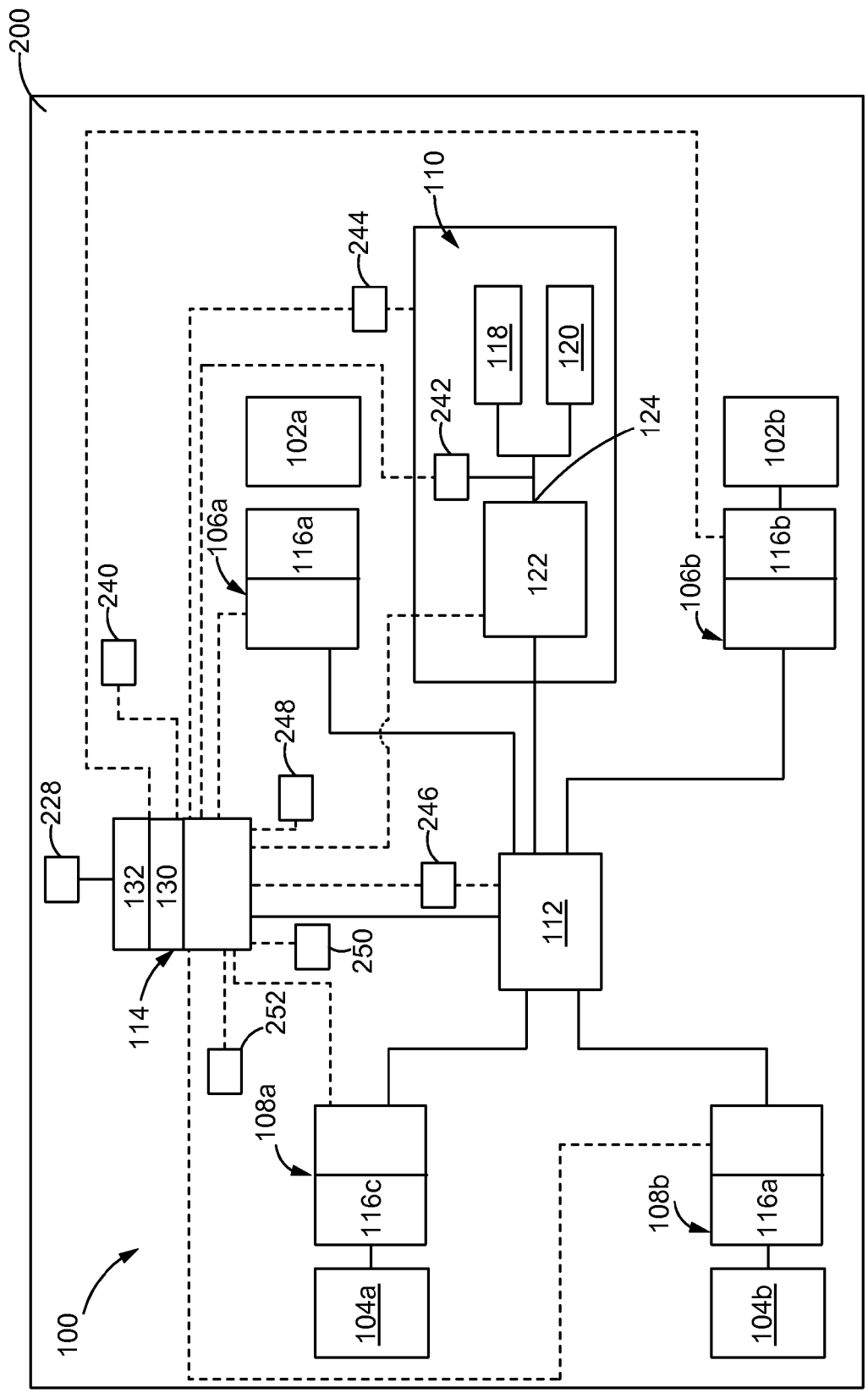
FIG. 1 is a general schematic view of an exemplary embodiment of a system constructed in accordance with the teachings of this disclosure.

Referring now to the drawings, and with specific reference to FIG. 1, there is shown a machine system in accordance with the present disclosure and generally referred to by reference numeral 100. The machine system 100 may comprise one or more front wheels 102, one or more rear wheels 104, one or more front powertrains 106, one or more rear powertrains 108, a hydraulic system 110, an engine 112, and a controller 114.

Figure 2:
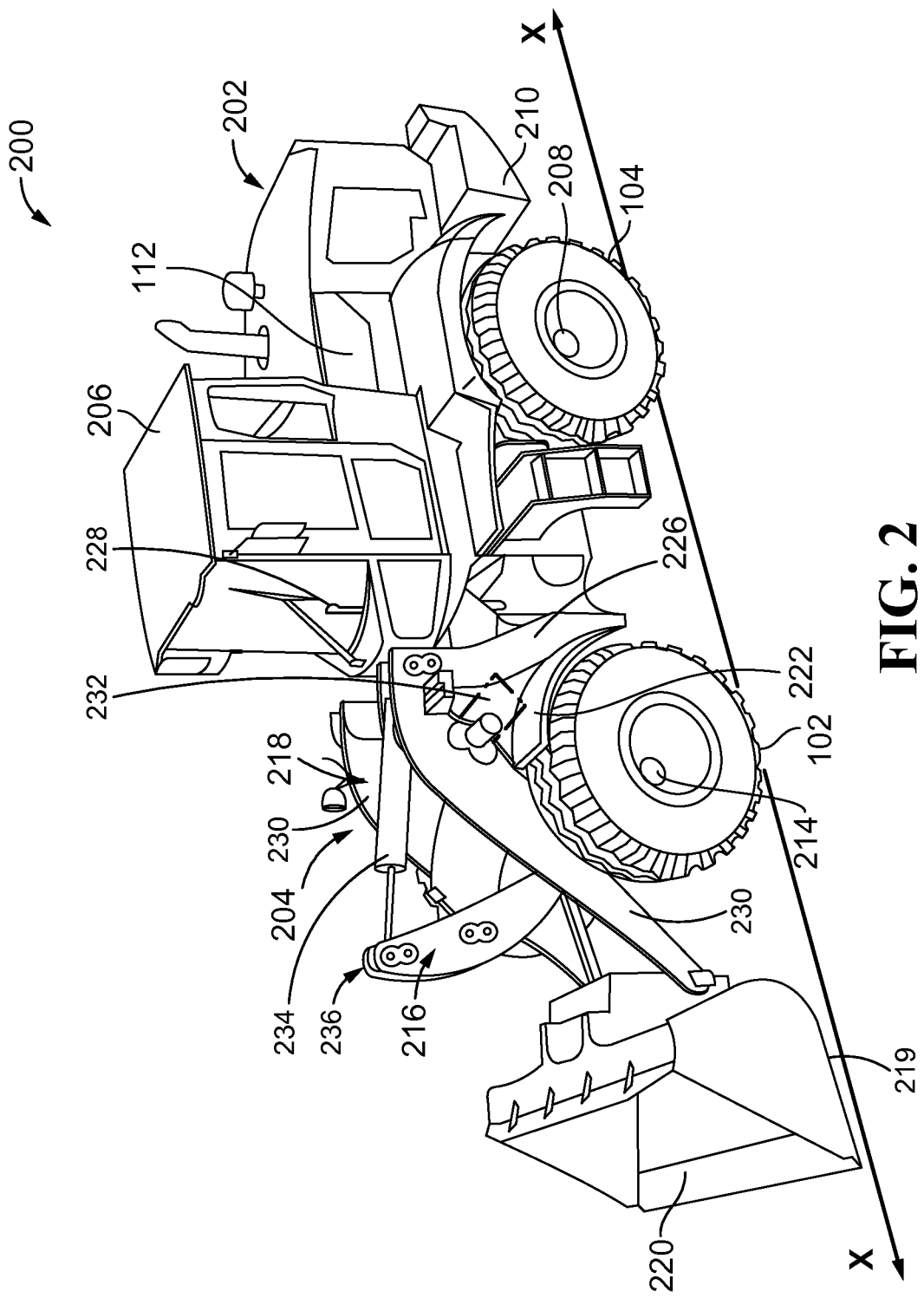
FIG. 2 is perspective view of an embodiment of an exemplary vehicle in which a system in accordance with the teachings of this disclosure may be used.

FIG. 2 illustrates one example of a machine 200, a wheel loader, which incorporates the features of the present disclosure. The machine 200 includes a rear portion 202 and a front portion 204. The rear portion 202 may include a cab assembly 206, and a rear axle assembly 208 mounted to a rear frame 210. The engine 112 may be mounted to the rear frame 210. The rear wheels 104 may be mounted to the rear axle assembly 208. The front portion 204 may include a frame assembly 226 and a front axle assembly 214. A lever assembly 216 and a lift arm assembly 218 may be pivotably mounted on the frame assembly 226. An implement 220, for example a bucket, may be attached to the lever assembly 216 and to the lift arm assembly 218. The bucket includes a base 219. The front wheels 102 may be mounted on the front axle assembly 214 which may be mounted on the frame assembly 226. A fender 222 may also be mounted on the frame assembly 226.

The cab assembly 206 may include a plurality of control devices 228, such as joysticks, user interfaces, controls and other types of display and input devices to provide input to the controller 114 (FIG. 1) regarding desired or requested control or movement of the implement 220, machine operation, machine speed control, and the like.

While the detailed description and drawings herein are made with reference to a machine system 100 mounted on wheel loader, the teachings of this disclosure may be employed on other machines, including, but not limited to, machines used in mining, earth moving, construction, farming, marine, transportation, material handling, or the like machines. For example, although a wheel loader is shown in certain figures, the machine may generally be an earth-moving machine, such as a wheel loader, dump truck, or may alternatively be any other type of machine, such as a material handler.

Turning back to FIG. 1, in the exemplary embodiment, the machine system 100 includes a plurality of front wheels 102a, 102b, a plurality of rear wheels 104a, 104b, a plurality of front powertrains 106a, 106b and a plurality of rear powertrains 108a, 108b. Each powertrain includes a motor 116. In such exemplary embodiment, the front powertrain 106a includes a motor 116a that is operably connected to the front wheel 102a, the front powertrain 106b includes a motor 116b that is operably connected to the front wheel 102b, the rear powertrain 108a includes a motor 116c that is operably connect to the rear wheel 104a, and the rear powertrain 108b includes a motor 116d that is operably connected to the rear wheel 104b. In the exemplary embodiment, each powertrain 106a-b, 108a-b is mounted on the machine 200 and is independently operable of the other powertrains. In other embodiments, there may be a single front powertrain (and motor) operably connected to one or more front wheels and a single rear powertrain (and motor) operably connected to the one or more rear wheels. Other powertrain and wheel combinations are within the scope of this disclosure. In the exemplary embodiment, the motors 116 are electric motors. In other embodiments, the motors 116 may be hydraulic motors.

In the exemplary embodiment, front and rear wheels 102a-b, 104a-b, front and rear powertrains 106a-b, 108a-b, the hydraulic system 110 and the engine 112 are disposed on the machine 200. In some embodiments, the controller 114 may be disposed on the machine 200 and, in other embodiments, the controller 114 may be remote from the machine 200.

The hydraulic system 110 may include an implement hydraulic system 120, and a pump 122 having an output port 124 through which fluid is supplied to the implement hydraulic system 120. In the exemplary embodiment, the hydraulic system 110 may also include a lift arm hydraulic system 118, and the pump may be configured to also supply fluid to the lift arm hydraulic system 118. The lift arm assembly 218 (FIG. 2) may include a pair of lift arms 230, and one or more lift arm actuators 232. The lift arms 230 may be pivotally connected to the frame assembly 226. The lift arm actuator 232 may extend between the frame assembly 226 and the lift arms 230. In an embodiment, the lift arm actuator 232 may be a rod and cylinder arrangement, as is known in the art. Fluid supplied by the pump 122 to the lift arm hydraulic system 118 may be used to provide pressurized fluid to the lift arm actuator 232 to raise and lower the lift arms 230.

The lever assembly 216 may include a pivot actuator 234 and linkage 236 disposed between the pivot actuator 234 and the implement (bucket) 220. The bucket 220 may be pivotally connected to an end of the linkage 236 and to the lift arms 230. The pivot actuator 234 may be disposed between the linkage 236 and the frame assembly 226. In an embodiment, the pivot actuator 234 may be a rod and cylinder arrangement, as is known in the art. Fluid supplied by the pump 122 to the implement hydraulic system 120 may be used to provide pressurized fluid to the pivot actuator 234 to pivot or tilt the bucket 220 about a pivot point.

A sensor 240 may be disposed on the machine 200 to provide an input signal to the controller 114 representative of the machine speed over the ground. Any appropriate sensor known in the art that is suitable for this purpose may be utilized. One or more pressure sensors 242 may be disposed proximal to the output port 124 of the pump 122 to measure the pump's hydraulic pressure. One or more sensors 244 may be disposed on the machine 200 to provide to the controller 114 input signals of measurements related to determining the hydraulic load of the machine 200. A sensor 246 may be disposed on the machine 200 to send to the controller 114 an input signal representative of a measurement of the engine load. One or more position sensors 248 may be disposed on the machine 200 to send a signal to the controller 114 representative of the position of the lift arm(s) 230 (FIG. 2). Similarly, one or more position sensors 250 (FIG. 1) may be disposed on the machine 200 to send a signal to the controller 114 representative of the position of the digging implement 220 or bucket (FIG. 2). In addition, sensors 252 (FIG. 1) or the like may be disposed on the machine 200 to send an input signal to the controller 114 representative of the gear stage that the machine 200 is operating in.

The engine 112 provides power to each powertrain 106, 108 and to the pump 122. The engine 112 may be any type of engine (internal combustion, gas, diesel, gaseous fuel, natural gas, propane, etc.), and may be of any size, with any number of cylinders, and in any configuration ("V," in-line, radial, etc.).

The controller 114 may be in operable communication with the engine 112, the pump 122 and each powertrain 106, 108. The controller 114 may also be in operable communication with operator input control devices 228. The controller 114 may include a processor 130 and a memory component 132. The processor 130 may be a microprocessor or other processor as known in the art. The processor 130 may execute instructions and generate control signals for processing a signal(s) indicative of when the machine is performing a given operation, for example digging, and for determining a Total Requested Machine Rimpull, Requested Rear Rimpull, Requested Front Rimpull, a Total Rimpull Derate, an Estimated Rear Rimpull, a Rear Rimpull Floor, a Shortfall, a Final Rear Rimpull, a Final Front Rimpull, a Final Rear Derate Amount, and a Final Front Derate Amount as explained later herein. Such instructions that are capable of being executed by a computer may be read into or embodied on a computer readable medium, such as the memory component 132 or provided external to the processor 130. In alternative embodiments, hard wired circuitry may be used in place of, or in combination with, software instructions to implement a control method.

The term "computer readable medium" as used herein refers to any non-transitory medium or combination of media that participates in providing instructions to the processor 130 for execution. Such a medium may comprise all computer readable media except for a transitory, propagating signal. Common forms of computer-readable media include, for example, a floppy disk, a flexible disk, hard disk, magnetic tape, or any other magnetic medium, a CD-ROM, any other optical medium, or any other medium from which a computer processor 130 can read.

The controller 114 is not limited to one processor 130 and memory component 132. The controller 114 may be several processors 130 and memory components 132.

The controller 114 may retrieve from the memory component 132 the derate percentage or may calculate such percentage.

INDUSTRIAL APPLICABILITY

Figure 3:
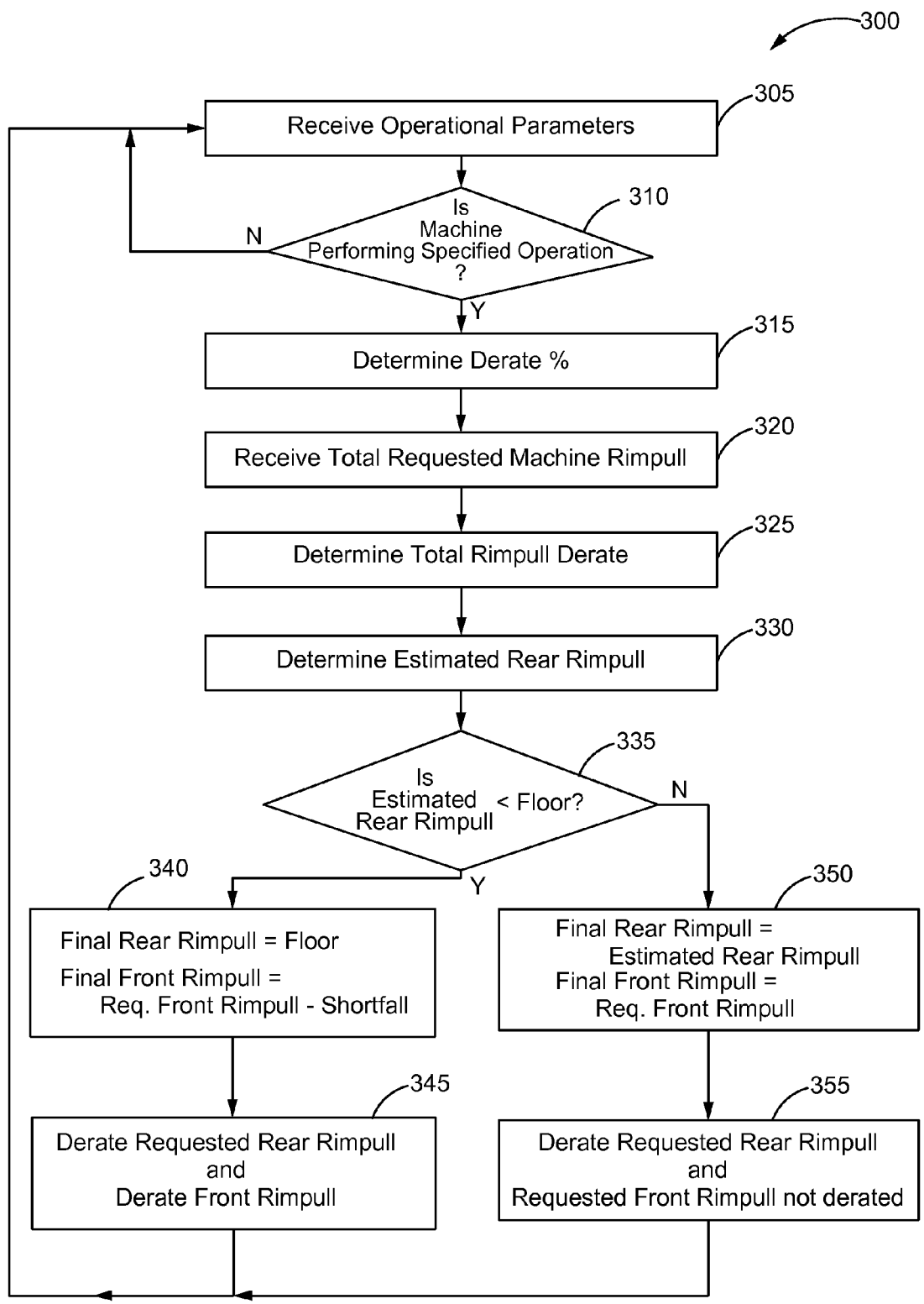
FIG. 3 is flowchart illustrating exemplary blocks of an exemplary method for derating rimpull in a machine, in accordance with the teachings of this disclosure.

Referring now to FIG. 3, an exemplary flowchart is illustrated showing sample steps which may be followed in derating rimpull in a machine. The method 300 may be practiced with more or less than the number of blocks shown and is not limited to the order shown. While in the exemplary flowchart the controller 114 processes operational parameters to determine if the machine 200 and implement 220 are digging, in other embodiments, the same or different operational parameters may be employed to determine machine operations other than digging and the teachings of this disclosure related to the derating of rimpull may be employed to derate the rimpull first from the rear wheels and then from the front wheels if necessary to achieve the desired rimpull derate for the machine.

Block 305 of the method includes receiving, by a controller 114, operational parameters. Such parameters may include data related to machine speed, and either hydraulic load or hydraulic pressure at the output port 124 of the pump 122 for the hydraulic system 110. The operational parameters may further include, but are not limited to, engine load, and implement (bucket) position. In some embodiments, operational parameters may also include lift arm position, and/or gear stage in which the machine is operating.

In one embodiment, the controller 114 may receive a signal from a sensor 240 indicative of the speed of the machine 200 and may process the signal, according to methods known in the art, to determine the speed of the machine 200. In an embodiment, in order for the machine to be digging, the machine speed should be below about 5 km/hour. In another embodiment, in order for the machine 200 to be digging, the machine speed should be below about 6 km/hour. Depending on machine 200 and digging environment, other ranges may be possible. If the machine 200 is traveling at a greater machine speed, the controller 114 may determine that the machine 200 is not digging.

The controller 114 may also receive from a signal from one or more sensors 246 indicative of the engine load. In one embodiment, the engine load should be above about 70% for the controller 114 to determine that the machine 200 is digging. In another embodiment, the engine load should be above about 80% for the controller 114 to determine that the machine 200 is digging. In other embodiments, other engine load thresholds may be utilized.

Figure 4:
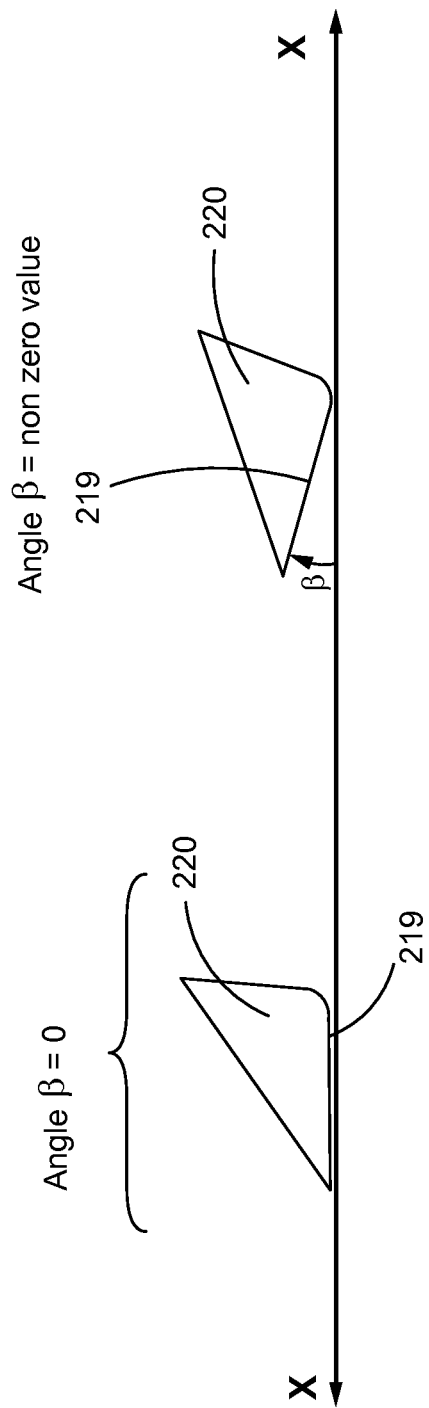
FIG. 4 is a schematic illustrating angle β.

The controller 114 may also receive and process signal(s) received from position sensors 248, 250, or other sensors known in the art, to determine lift arm position and/or implement position (in the exemplary embodiment, the bucket position), and may utilize this information to determine whether the machine 200 is digging. For example, in one embodiment, the bucket base 219 should be substantially horizontal to a plane X generally parallel to the ground and proximal to the surface to which the front and rear wheels make contact with the ground, plus or minus an angle β of about (5) five degrees, for the controller 114 to determine that the machine 200 is digging. In another embodiment, the bucket base 219 should be substantially horizontal to a plane X generally parallel to the ground and proximal to the surface to which the front and rear wheels make contact with the ground, plus or minus an angle β about (10) ten degrees, for the controller 114 to determine that the machine 200 is digging. Angle β can be seen in FIG. 4.

As shown in FIG. 5A, the lift arm angle α is conventionally considered to be zero (0) degrees when the lift arm is parallel to the ground (the "Baseline Horizontal Plane H"). In embodiments that include lift arms, the lift arms 230 have a "Digging Position" which is the position of the lift arms 230 when the bucket base 219 is horizontal to a plane X generally parallel to the ground and is generally level with the base (bottom) of the machine wheels (see FIG. 2) contacting the ground. This digging position is shown in FIG. 5B. The lift arm angle α in the Digging Position may be a non-zero value. More specifically, the lift arm angle α, as shown in FIG. 5B, may be a negative non-zero value. For the controller 114 to determine that the machine 200 is digging, the lift arm angle α should be below the Baseline Horizontal Plane H. As considered from the above described frame of reference, the lift arm angle α should be a negative value.

In some embodiments, but not all embodiments, the controller 114 may determine the gear that the machine 200 is operating in and use this information in the determination of whether the machine 200 is digging. For example, in one embodiment, the machine 200 may need to be operating in first gear in order for the controller 114 to determine that the machine 200 is digging.

In block 310, the controller 114 processes operational parameters to determine if the machine 200 and implement 220 are currently performing the specified operation, in the exemplary embodiment, digging. In one embodiment, the controller 114 may determine if the machine 200 and implement 220 are digging based on one or more of the following parameters: machine speed, engine load, lift arm 230 position, and implement position (bucket base 219 position). In other embodiments, other factors may also be considered by the controller 114 such as the gear in which the machine 200 is operating. For example, in some embodiments, in addition to using machine speed, engine load, lift arm position and implement position in a determination of whether the machine 200 is digging, the controller 114 may require that the machine 200 be operating in first gear in order to conclude that the machine 200 is digging. If the controller 114 determines that the machine 200 is not digging, the process returns to block 305.

If the controller determines that the machine 200 is currently digging, the process proceeds to block 315. In block 315, the controller 114 determines an aggregate rimpull derate percentage for the machine wheels based on the current machine speed and either the hydraulic load or hydraulic pressure. The controller 114 may receive a signal from one or more pressure sensors 242 indicative of the fluid pressure at the output port 124 of the pump 122 for the machine's hydraulic system 110 and may process this signal, according to methods known in the art, to determine the hydraulic pressure at the pump 122 generated by machine operation of the lift actuator(s) 232 (in embodiments that include lift arms) and pivot actuator(s) 234. In an embodiment, the hydraulic pressure should be in a range from about 0 kPA (kilo-Pascal) to about 32,000 kPa for the machine 200 to be digging. Alternatively, or in addition to, the controller 114 may receive data from sensors 244 indicative of the hydraulic load of the machine 200, and may process such data, according to methods known in the art, to determine the hydraulic load placed on the hydraulic system 110 by machine operation.

In one embodiment, the controller 114 may utilize a look up table to determine a rimpull derate percentage that is mapped to the machine speed and hydraulic load or pressure. In other embodiments, the controller 114 may determine the derate percentage using an algorithm stored in memory that uses machine speed and hydraulic load or pressure to calculate the derate percentage.

In block 320, the controller 114 receives the total machine rimpull requested by the operator (the "Total Requested Machine Rimpull"). The Total Requested Machine Rimpull is based on operator input to control device(s) 228 for the machine 200. Such operator input may include, but is not limited to, throttle position, brake pedal position, neutralizer pedal position, economy mode position, retarding pedal position or other control devices. The Total Requested Machine Rimpull has two components, the requested rimpull for the rear wheel(s) (the "Requested Rear Rimpull" (RRR)) and the requested rimpull for the front wheel(s) (the "Requested Front Rimpull" (RFR)).

In block 325, the controller 114 determines the "Total Rimpull Derate." This is the total amount of rimpull to be derated on the machine 200. In an embodiment, the controller 114 may determine this number by multiplying the derate percentage from block 315 times the Total Requested Machine Rimpull of block 320.

In block 330, the controller determines the "Estimated Rear Rimpull." This is the difference between RRR and the Total Rimpull Derate.

In block 335, the controller 114 determines whether the Estimated Rear Rimpull is less than a "Rear Rimpull Floor." The Rear Rimpull Floor is the minimum value of rear rimpull allowed for the rear wheel(s) when the machine is digging. In some embodiments the Rear Rimpull Floor may be zero, which, in effect, means that the there is no minimum and the rear rimpull may be reduced to zero, effectively neutralizing the rear axle. In other embodiments, the Rear Rimpull Floor may be a value greater than zero. In some embodiments, this may be due to machine design. The Rear Rimpull Floor may be related to the operating conditions of the machine. In some embodiments, the Rear Rimpull Floor may vary dynamically with machine operation. In one embodiment, the controller 114 may utilize a look up table to determine a Rear Rimpull Floor that is mapped to the machine speed and hydraulic load or pressure. In other embodiments, the controller may determine the Rear Rimpull Floor using an algorithm stored the memory component 132.

If the Estimated Rear Rimpull (the Requested Rear Rimpull less the Total Rimpull Derate) is less than the Rear Rimpull Floor, the controller 114, in block 340, determines or sets the "Final Rear Rimpull" to be substantially the same as the Rear Rimpull Floor. The controller 114 calculates the difference between the Rear Rimpull Floor and the Estimated Rear Rimpull. This difference is referred to herein as the "Shortfall". The controller 114 then determines the "Final Front Rimpull" to be the difference between the Requested Front Rimpull and the Shortfall. Stated another way, in this scenario, the Final Front Rimpull is substantially equal to the Requested Front Rimpull less the difference between the Rear Rimpull Floor and Estimated Rear Rimpull.

In block 345, the controller derates the rear wheel(s) rimpull by a "Final Rear Derate Amount" so that the rear rimpull after derating is substantially equal to the Final Rear Rimpull. The Final Rear Derate Amount is the difference between the Requested Rear Rimpull and the Final Rear Rimpull. In the scenario above, this means that the rear rimpull after derating is substantially equal to the Rear Rimpull Floor. The controller 114 also derates the front wheel(s) rimpull by a "Final Front Derate Amount" so that the front rimpull is substantially equal to Final Front Rimpull determined in block 340. The Final Front Derate Amount is the difference between the Requested Front Rimpull and the Final Front Rimpull.

If the Estimated Rear Rimpull is greater or equal to the Rear Rimpull Floor, in block 350, the controller 114 sets the Final Rear Rimpull equal to the Estimated Rear Rimpull and sets the Final Front Rimpull equal to the Requested Front Rimpull. In other words, the rear wheel(s) incur all of the rimpull derating for the machine and no rimpull derating is applied to the front wheel(s).

In block 355, the controller 114 derates the rear wheel(s) rimpull by the Final Rear Derate Amount so the rear rimpull is adjusted to be substantially equal to the Final Rear Rimpull. No derating is applied to the front wheel(s) rimpull.

Also disclosed is a computer program product, comprising a non-transitory computer usable medium having a computer readable program code embodied therein, the computer readable program code adapted to be executed to implement a method for derating rimpull in a machine. The machine including a front wheel, a rear wheel, a front powertrain operably connected to the front wheel, and a rear powertrain operably connected to the rear wheel, each powertrain independent of the other. The method comprising, when the machine is digging, determining a Total Rimpull Derate for the machine based at least in part on the machine speed and the hydraulic load or pressure, determining a Final Rear Derate Amount, derating the rear wheel rimpull by the Final Rear Derate Amount, and if the Final Rear Derate Amount is less than the Total Rimpull Derate for the machine, derating the front wheel rimpull by a difference between the Total Rimpull Derate and the Final Rear Derate Amount. In an embodiment, the method may further comprise determining an Estimated Rear Rimpull, and, if the Estimated Rear Rimpull is greater than or equal to a Rear Rimpull Floor, setting the Final Rear Derate Amount substantially equal to the Total Rimpull Derate and applying substantially no rimpull derate to the front wheel rimpull. In another embodiment, the method may further comprise determining an Estimated Rear Rimpull, if the Estimated Rear Rimpull is less than a Rear Rimpull Floor, derating the rear wheel rimpull until the rear wheel rimpull is substantially equal to the Rear Rimpull Floor.

The features disclosed herein may be particularly beneficial for use with manual control devices on mining, earth moving, construction, farming, marine, transportation, material handling machines. The ability to control the derating of the rimpull of the machine facilitates better control of the machine/implement during digging.

What is claimed is:

1. A machine system for controlling rimpull on a machine, the machine including an implement, the system comprising:
    a front wheel and a rear wheel, each mounted on the machine;
    a front powertrain operably connected to the front wheel, and a rear powertrain operably connected to the rear wheel, each powertrain independently operable of the other;
    a hydraulic system including an implement hydraulic system, and a pump having an output port that provides fluid to the implement hydraulic system to move the implement;
    an engine that provides power to each powertrain, and to the pump; and
    a controller in operable communication with the engine, the pump and each powertrain, the controller configured to:
        determine a Total Rimpull Derate for the machine based at least in part on machine speed, and hydraulic pressure at the output port of the pump or hydraulic load;
        determine a Final Rear Derate Amount;
        derate rear wheel rimpull by the Final Rear Derate Amount; and
        if the Final Rear Derate Amount is less than the Total Rimpull Derate for the machine, derate front wheel rimpull by a difference between the Total Rimpull Derate and the Final Rear Derate Amount.

2. The machine system of claim 1, wherein the Total Rimpull Derate is determined, at least in part, based on Total Requested Machine Rimpull.

3. The machine system of claim 1, wherein the Total Rimpull Derate is determined, at least in part, based on the machine's hydraulic load.

4. The machine system of claim 1, wherein the Total Rimpull Derate is determined, at least in part, based on the machine's hydraulic pressure at the output port of the pump.

5. The machine system of claim 1, wherein the controller is further configured to
    determine an Estimated Rear Rimpull; and
    if the Estimated Rear Rimpull is greater than or equal to a Rear Rimpull Floor, set the Final Rear Derate Amount substantially equal to the Total Rimpull Derate and apply substantially no rimpull derate to the front wheel rimpull.

6. The machine system of claim 1, wherein the controller is further configured to:
    determining an Estimated Rear Rimpull; and
    if the Estimated Rear Rimpull is less than a Rear Rimpull Floor, derate the rear wheel rimpull until the rear wheel rimpull is substantially equal to the Rear Rimpull Floor.

7. The machine system of claim 1, in which the machine further includes a lift arm pivotally mounted to the machine, and the hydraulic system further includes a lift arm hydraulic system, wherein the pump is configured to provide fluid to the lift arm hydraulic system to move the lift arm, wherein further the Total Rimpull Derate for the machine is determined if the machine is digging.

8. The machine system of claim 7, wherein the controller is further configured to determine whether the machine is digging based, at least in part on, engine load.

9. The machine system of claim 1, wherein the front wheel is comprised of first and second front wheels, the rear wheel is comprised of first and second rear wheels, the front powertrain is comprised of first and second front powertrains, and the rear powertrain is comprised of first and second rear powertrains, the wheels and powertrains in a one-to-one correspondence.

10. A method for derating rimpull on a machine, the machine including a front wheel, a rear wheel, a front powertrain operably connected to the front wheel, and a rear powertrain operably connected to the rear wheel, each powertrain independent of the other, the method comprising:

when the machine is digging, determining a Total Rimpull Derate for the machine based, at least in part, on machine speed;

determining a Final Rear Derate Amount;

derating the rear wheel rimpull by the Final Rear Derate Amount; and if the Final Rear Derate Amount is less than the Total Rimpull Derate for the machine, derating the front wheel rimpull by a difference between the Total Rimpull Derate and the Final Rear Derate Amount.

11. The method of claim 10, wherein the Total Rimpull Derate is determined, at least in part, based on Total Requested Machine Rimpull.

12. The method of claim 10, wherein the Total Rimpull Derate is determined, at least in part, based on the machine's hydraulic load.

13. The method of claim 10, wherein the Total Rimpull Derate is determined, at least in part, based on the machine's hydraulic pressure at an output port of a pump that supplies hydraulic fluid to a lift arm hydraulic system and an implement hydraulic system disposed on the machine.

14. The method of claim 10, further comprising:
determining an Estimated Rear Rimpull; and
if the Estimated Rear Rimpull is greater than or equal to a Rear Rimpull Floor, setting the Final Rear Derate Amount substantially equal to the Total Rimpull Derate and applying substantially no rimpull derate to the front wheel rimpull.

15. The method of claim 10, further comprising:
determining an Estimated Rear Rimpull; and
if the Estimated Rear Rimpull is less than a Rear Rimpull Floor, derating the rear wheel rimpull until the rear wheel rimpull is substantially equal to the Rear Rimpull Floor.

16. The method of claim 10, further comprising determining whether the machine is digging based, at least in part on, engine load for the machine.

17. The method of claim 10, wherein the front wheel is comprised of first and second front wheels, the rear wheel is comprised of first and second rear wheels, the front powertrain is comprised of first and second front powertrains, and the rear powertrain is comprised of first and second rear powertrains, the wheels and powertrains in a one-to-one correspondence, each powertrain operably connected to an engine independent of the other powertrains.

18. A computer program product comprising a non-transitory computer usable medium having a computer readable program code embodied therein, the computer readable program code adapted to be executed to implement a method for derating rimpull on a machine, the machine including a front wheel, a rear wheel, a front powertrain operably connected to the front wheel, and a rear powertrain operably connected to the rear wheel, each powertrain independent of the other, the method comprising:

when the machine is digging, determining a Total Rimpull Derate for the machine based at least in part on the machine speed and the hydraulic load or pressure;

determining a Final Rear Derate Amount;

derating the rear wheel rimpull by the Final Rear Derate Amount; and if the Final Rear Derate Amount is less than the Total Rimpull Derate for the machine, derating the front wheel rimpull by a difference between the Total Rimpull Derate and the Final Rear Derate Amount.

19. The computer program product of claim 18, in which the method further comprises:
determining an Estimated Rear Rimpull; and
if the Estimated Rear Rimpull is greater than or equal to a Rear Rimpull Floor, setting the Final Rear Derate Amount substantially equal to the Total Rimpull Derate and applying substantially no rimpull derate to the front wheel rimpull.

20. The computer program product of claim 18, in which the method further comprises:
determining an Estimated Rear Rimpull;
if the Estimated Rear Rimpull is less than a Rear Rimpull Floor, derating the rear wheel rimpull until the rear wheel rimpull is substantially equal to the Rear Rimpull Floor.

* * * * *